UNITED STATES PATENT OFFICE.

MAX WEILER, OF ELBERFELD, GERMANY, ASSIGNOR TO SYNTHETIC PATENTS CO., INC., OF NEW YORK, N. Y., A CORPORATION OF NEW YORK.

BLUE TRIPHENYLMETHANE DYE.

1,218,232.  Specification of Letters Patent.  Patented Mar. 6, 1917.

No Drawing.  Application filed March 27, 1915.  Serial No. 17,526.

*To all whom it may concern:*

Be it known that I, MAX WEILER, doctor of philosophy, chemist, citizen of the German Empire, residing at Elberfeld, Germany, have invented new and useful Improvements in Blue Triphenylmethane Dyes, of which the following is a specification.

I have found that new and valuable coloring matters of the triphenylmethane series can be obtained by condensing an amin with a dye of this series containing a sulfonic group in para position to the carbinol carbon atom, the sulfonic group being replaced by the radical of the amin.

The new dyestuffs have most probably the following general formula:

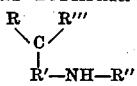

R and R‴ stand for the radicals of aromatic bases which may contain a sulfonic group; R′ for an arylene radical such as —C₆H₄—; R″ for an aryl or aralkyl radical such as phenyl, naphthyl, benzyl, etc. The new dyes are after being dried and pulverized dark powders soluble with difficulty in water generally with a violet to bluish coloration; dyeing wool from acid baths generally from violet to blue shades fast to light.

In order to illustrate the new process more fully the following example is given, the parts being by weight:—The triphenylmethane color is first trisulfonated and oxidized in any suitable manner, for instance as follows:

250 parts of the leuko base of the dyestuff obtained from benzaldehyde and ethylbenzylmetatoluidin are dissolved in 900 parts of sulfuric acid mono hydrate. After adding 360 parts of 65% fuming sulfuric acid, the mass is stirred until a sample is soluble in cold water. The melt is introduced into 2,000 parts of ice water and salted out with 1,750 parts of sulfate of sodium. The separated resinous mass of the leuko compound is treated with lime, separated from the gypsum which has been formed and by means of washing water is brought up to 2,500 parts. 538 parts of the thus obtained leuko solution corresponding to 53.8 parts of leuko base are stirred at 15° C. for five minutes with 150 parts of 10% hydrochloric acid and subsequently with 29 parts of superoxid of lead in the form of a 100% paste. Then the lead is removed by means of sulfuric acid and the solution filtered from the sulfate of lead, is salted out with sulfate of sodium. The coloring matter thus separated is first dried at a temperature of 35 to 40° C. on the water bath and finally at 60° C.

20 parts of the resulting trisulfonated and oxidized product are heated to 105° C. during one hour together with 60 parts of paratoluidin. The blue melt thus obtained is then introduced into dilute hydrochloric acid and the new dyestuff precipitated is filtered off and dried. It is a dark powder soluble with difficulty in water with a blue coloration. It dyes wool pure greenish-blue shades fast to alkali. The reaction proceeds in accordance with the following equation:

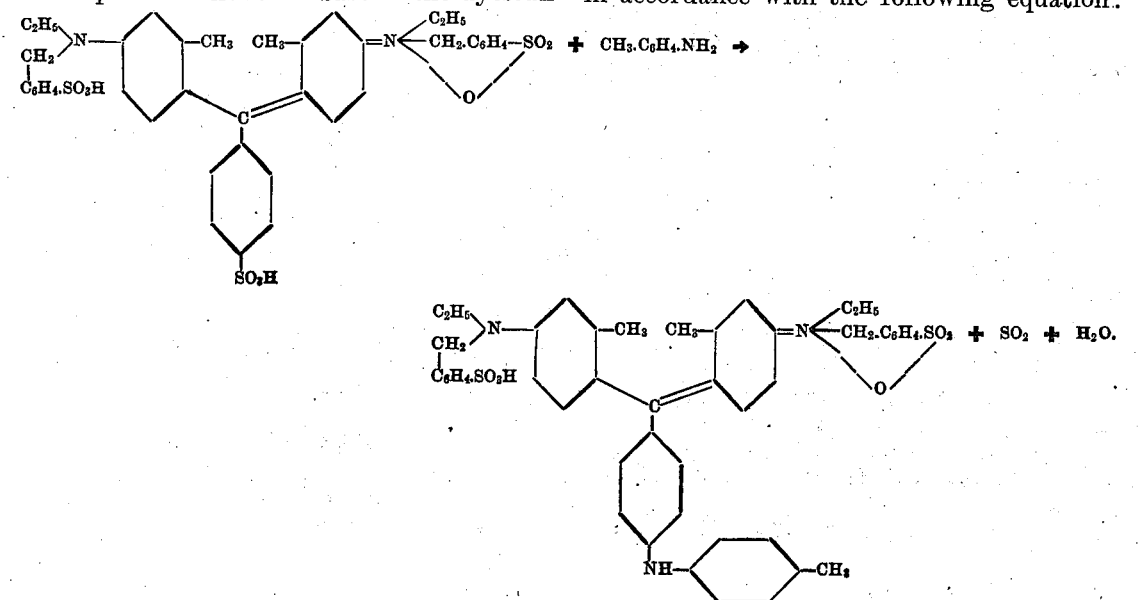

Instead of para-toluidin other bases can be used, *e. g.* anilin, aminophenols, naphthylamin, aliphatic bases, etc.

One can also use other dyes as starting materials *e. g.* dyes obtained from ethyl- or methylbenzylanilin, benzyl-ortho-toluidin, diethylanilin, dimethylanilin, diethyl-meta-toluidin or dyes derived from benzaldehyde disulfonic acids such as benzaldehyde-3.4-disulfonic acid, etc.

I claim:—

1. The new dyestuffs which can be obtained by heating an aromatic amin with an aminotriphenylmethane color which contains a sulfo group in para position to the carbinol carbon atom, the new dyestuffs having probably the general formula

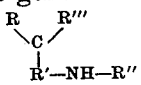

in which R and R''' represent the radicals of aromatic bases which may contain a sulfo group, R' means an arylene radical, and R'' means an aryl or aralkyl radical, which dyes are after being dried and pulverized dark powders soluble with difficulty in water generally with a violet to bluish coloration; dyeing wool violet to blue shades fast to light, substantially as described.

2. The new dyestuffs which can be obtained by heating an aromatic amin with a diaminotriphenylmethane color which contains a sulfo group in para position to the carbinol carbon atom, the new dyestuffs having probably the general formula

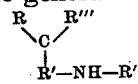

in which R represents an alkyl-aminoaryl radical which may contain a sulfo group, and R''' the radical of an aromatic base, R' means an arylene radical, and R'' means an aryl or aralkyl radical, which dyes are after being dried and pulverized dark powders soluble with difficulty in water generally with a violet to bluish coloration; dyeing wool violet to blue shades fast to light, substantially as described.

3. The new dyestuffs which can be obtained by heating an aromatic amin with a diaminotriphenylmethane color which contains a sulfo group in para position to the carbinol carbon atom, the new dyestuffs having probably the general formula in which R represents a dialkylaminoaryl radical which may contain a sulfo group, and R''' the radical of an aromatic base, R' means a phenylene radical, and R'' means an aryl or aralkyl radical, which dyes are after being dried and pulverized dark powders soluble with difficulty in water generally with a violet to bluish coloration; dyeing wool violet to blue shades fast to light, substantially as described.

4. The new dyestuffs which can be obtained by heating an aromatic amin with an aminotriphenylmethane color which contains a sulfo group in para position to the carbinol carbon atom, the new dyestuffs having probably the general formula in which R and R''' represent the radicals of aromatic bases, one of said radicals containing a quinquivalent nitrogen atom, R' means an arylene radical, and R'' means an aryl or aralkyl radical, which dyes are after being dried and pulverized dark powders soluble with difficulty in water generally with a violet to bluish coloration; dyeing wool violet to blue shades to light, substantially as described.

5. The new dye having in a free state most probably the formula:

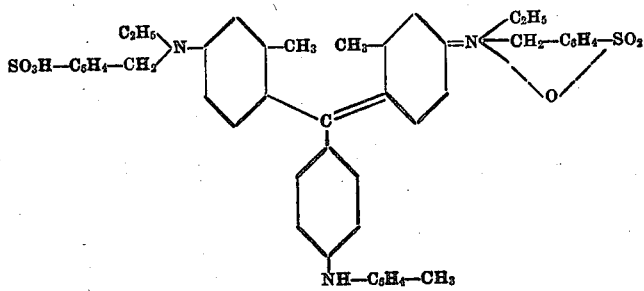

which is after being dried and pulverized a dark powder soluble in water with a bluish coloration and dyeing wool pure greenish-blue shades fast to alkali, substantially as described.

In testimony whereof I have hereunto set my hand in the presence of two subscribing witnesses.

MAX WEILER. [L. S.]

Witnesses:
 HELEN NUFER,
 ALBERT NUFER.